July 3, 1951

W. P. WILLS 2,559,383

MULTIPLE RECORDING INSTRUMENT

Filed Oct. 31, 1946

INVENTOR.
WALTER P. WILLS
BY
ATTORNEY.

July 3, 1951  W. P. WILLS  2,559,383
MULTIPLE RECORDING INSTRUMENT
Filed Oct. 31, 1946  2 Sheets-Sheet 2

INVENTOR.
WALTER P. WILLS
BY
ATTORNEY.

Patented July 3, 1951

2,559,383

UNITED STATES PATENT OFFICE 2,559,383

MULTIPLE RECORDING INSTRUMENT

Walter P. Wills, Philadelphia, Pa., assignor, by mesne assignments, to Minneapolis-Honeywell Regulator Company, Minneapolis, Minn., a corporation of Delaware Application October 31, 1946, Serial No. 706,941

5 Claims. (Cl. 346—33)

The present invention relates to recording instruments, and more particularly to a multiple recording instrument in which the drive means for moving the recording element is disconnected from its source of power just prior to each recording operation.

In some modern high speed recording instruments the mechanism which is used to move the recording element across the chart operates continuously in response to changes in the condition whose value is being measured and recorded. It frequently happens, when the condition under measurement is subject to rapid fluctuations, that after the instrument has balanced and started to make a record the condition value will change. The recording element will then start to move while printing is taking place with the result that the record is blurred, and in some cases, the chart may be torn.

It is an object of the present invention to overcome the above mentioned difficulty by providing a mechanism that is operative to disconnect the drive mechanism for a recording element just prior to the time that a recording operation takes place. The particular instrument with which the invention is described is a multiple recording potentiometer. In this instrument a reversible electric motor is continuously energized in response to potentiometer unbalance to rebalance the instrument and move the recording element. When the instrument is balanced, mechanism included therein is operated to bring the recording element into printing engagement with a chart and to connect another condition responsive element to the instrument. Means is provided to deenergize the electric motor in response to the beginning of a printing movement of the recording element and to keep the motor deenergized until after the printing operation has taken place.

It is a further object of the invention to provide a multiple recording instrument in which it will not be possible to blur a record or tear the chart while a printing operation is being performed.

A further object of the invention is to provide a multiple recording instrument in which the drive means for the recording element is stopped during the time in which a recording operation is taking place and a new responsive element is being connected to the instrument.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figures 1, 2:
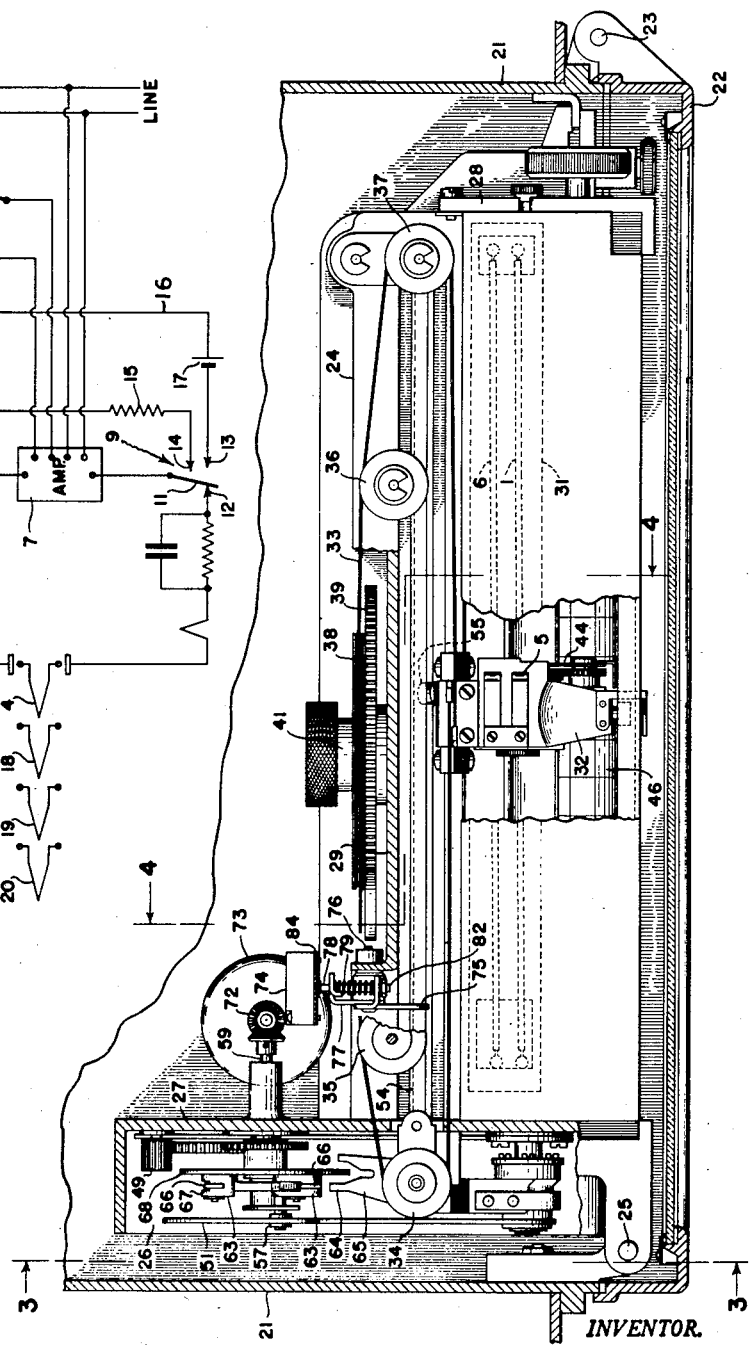
Figure 1 is a diagrammatic circuit of a potentiometer network.
Figure 2 is a top view partly in section of the potentiometer recording mechanism.

In Figure 1 there is shown a typical potentiometer circuit in which there is a slidewire 1 that has a potential impressed across it by a battery 2 to produce a predetermined voltage drop, the battery preferably being in the form of a dry cell. Connected in circuit with the battery is a variable resistance 3 that is used to maintain constant the potential drop in the circuit, as the battery diminishes in power, in order to maintain the system in calibration. The voltage from a primary measuring element, shown herein by way of example only as a thermocouple 4, is impressed across a portion of the slidewire 1 as determined by the position of a contact 5 between the slidewire and a parallel collector bar 6. As the thermocouple temperature changes, the potentiometer circuit becomes unbalanced and this in turn is detected by a vibrator and amplifier unit 7 to energize a motor 8 to shift the contact 5 along the slidewire in the proper direction and amount in order to rebalance the potentiometer circuit. The details of the vibrator and amplifier are disclosed in the copending application of Walter P. Wills, Serial No. 421,173 which was filed on December 1, 1941, and which issued as Patent No. 2,423,540 on July 8, 1947, and they are characterized by the ability to energize continuously the motor 8 for rotation in the proper direction whenever the potentiometer circuit is unbalanced.

The thermocouple is normally connected in the circuit by means of a switch 9 which consists of a movable contact 11 that is directly connected to the amplifier, and a stationary contact 12 that is connected to the thermocouple. This switch is also provided with stationary contact 13 that is connected to the potentiometer network, and stationary contact 14 that is used to insert a shunt resistance 15 around the amplifier at such times as the potentiometer circuit is being standardized. In the wire 16 between the contact 13 and the potentiometer network there is located a standard cell 17 which is used to impress a standard potential drop across a portion of the potentiometer network at such times as the network is being recalibrated or standardized.

In the operation of a potentiometer network of the type disclosed above, upon the occurrence of a change in temperature of a thermocouple 4, the potentiometer circuit will be unbalanced to produce a current flow in one direction or the other through the vibrator which is included along with the amplifier and designated as 7. The vibrator and amplifier will detect this unbalance, its direction and amount, and correspondingly energize the motor 8 for rotation in the proper direction. This motor is mechanically connected, in a manner to be described, with the contact 5 so that the latter is shifted along the slidewire 1 and collector 6 to a position in which the potentiometer circuit is again rebalanced and no current flows through the unit 7.

Due to the fact that the strength of the battery 2 gradually diminishes with use it becomes necessary to adjust the resistance 3 from time to time in order to maintain the calibration of the instrument. At such times as the instrument is to be recalibrated or standardized, the movable contact 11 of the switch 9 is shifted to the right to disconnect the thermocouple from the circuit and to insert the standard cell 17 across a portion thereof and to simultaneously insert the shunt 15 around the unit 7. If the circuit needs recalibration a current flow will be produced through the unit 7 in a manner similar to that produced by the thermocouple 4, producing an energization of the motor 8 to rotate this motor in a direction and an amount proportional to the potentiometer unbalance at that time. This rotation of the motor is used to adjust the amount of resistance 3 which is inserted in the circuit.

The potentiometer instrument shown herein is designed to measure sequentially the value of a number of temperatures as measured by thermocouples subjected thereto. To this end, there is shown in Figure 1 a series of thermocouples 18, 19 and 20, in addition to the thermocouple 4 which may be connected in the potentiometer circuit one after another in any conventional manner such as by means of a suitable thermocouple switch described below.

Figure 3:
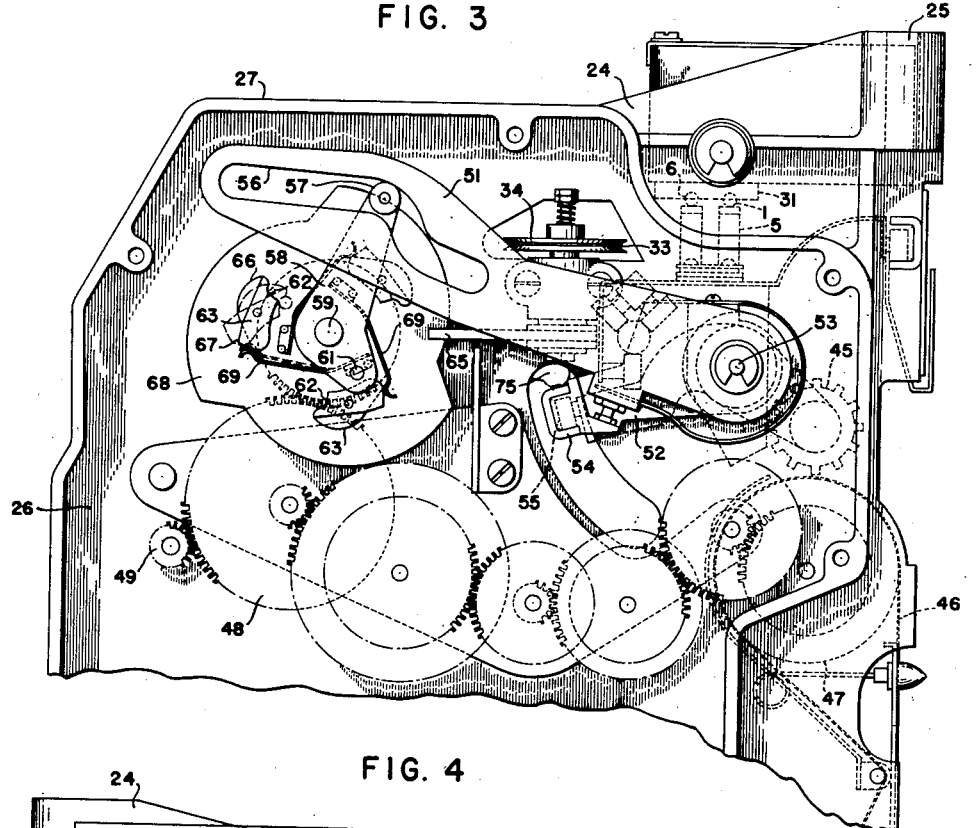
Figure 3 is a view taken on line 3—3 of Figure 2.
Figure 4:
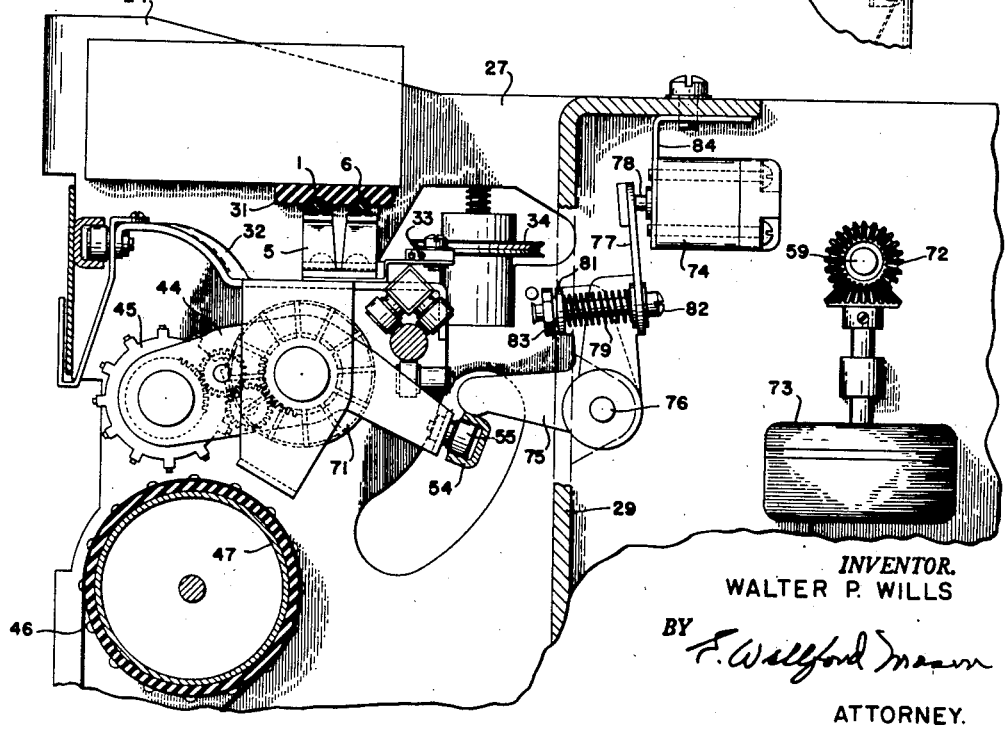
Figure 4 is a view taken on line 4—4 of Figure 2.

Referring to Figures 2, 3 and 4, there is shown broken away an instrument casing 21 in which the entire potentiometer mechanism is located. This casing is provided with a door 22 that is hinged at 23 and may be swung out of the way to give access to the structure to be presently described. A casting 24 upon which the potentiometer structure is mounted is hinged at 25 in the casing, and may be swung from the position shown out of the casing when the door 22 is opened, to give access to the structure carried thereby for adjustment and repair. The casting 24 is provided with a compartment 26 on its left side, and with side plates 27 and 28 that are joined by a connecting wall 29. A support 31 for the slidewire 1 is mounted between the side plates 27 and 28, and carries this slidewire along with the collecting bar 6 on the lower side thereof as is shown best in Figure 4. Beneath the slidewire and suitably mounted for sliding movement across the instrument is a print wheel carriage 32 which has attached to and insulated from its upper surface the contact 5 so that this contact may engage the slidewire and the collector bar as the carriage 32 is moved transversely of the instrument.

The print wheel carriage is driven by means of a cable 33 which has its ends attached to the carriage and which passes over pulleys 34, 35, 36 and 37, the latter of which is biased in a counterclockwise direction in order to take up any slack in the cable. The cable 33 is driven by a large pulley 38 as shown in Figure 2. This pulley is attached to a gear 39 that is mounted for rotation on shaft 41, and the pulley and the gear are driven together by means of a pinion that is on the shaft of motor 8. This motor is mounted beneath the print wheel carriage and on the front portion of the wall 29, while the pinion extends to the rear of this wall where it meshes with the gear 39 and the structure carried thereby.

The operation of the instrument is such that when an unbalance in the potentiometer circuit occurs the motor 8 will be rotated in the proper direction to drive gear 39 and pulley 38 so that the cable wrapped around the pulley will shift the print wheel carriage transversely between the side plates of the instrument casing. As the print wheel carriage moves, the contact 5 carried thereby will be moved along the slidewire 1 until the potentiometer circuit is rebalanced at which time the motor will stop.

The print wheel carriage has pivoted in it a support 44 upon which is mounted a print wheel 45. This support is moved in a manner to bring the print wheel into and out of engagement with a chart 46 to make an impression on that chart corresponding to the value of the temperature being measured at that time by the instrument. The chart is fed from a supply roll that is not shown over a chart drum 47, and is supplied to a chart take-up roll that is also not shown. The chart drum 47 is driven at a suitable speed by means of a train of gears 48 that is in turn driven from a pinion 49 which is connected to the shaft of a suitable constant speed drive motor. In the operation of the instrument, the motor 8 serves, through connections previously described, to shift the print wheel carriage transversely of the instrument to a position above the chart corresponding to the temperature which is then being measured. Thereafter the support 44 is moved in the print wheel carriage to bring the print wheel into engagement with the chart and is moved out of engagement with the chart. Immediately thereafter, the instrument is connected to another one of the thermocouples so that the rebalancing operation may be repeated.

The movement of the support 44 is accomplished by means of a compound lever 51, 52 that is oscillated around a shaft 53. As the compound lever oscillates the portion 52 moves a channel member 54 that is attached thereto and which extends transversely of the instrument. This channel member receives a roller 55 that is attached to the rear end of the support 44. Therefore, as the channel member is moved up and down the print wheel 45 will be moved into and out of engagement with the chart. The lever 51 is oscillated by means of engagement between a slot 56 formed therein and a roller 57 on the end of a crank 58 that serves to rotate a shaft 59 to which it is attached. The crank is rotated clockwise by means of engagement between a pin 61 on its short arm and a cut out portion 62 formed on one of the pawls 63 which are pivoted on a cam 68 that rotates around the shaft 59. In the position shown the pawls are in such a position that their cut out portions 62 are at a sufficient radial distance from the shaft 59 so that they can be moved past the pin 61 without engaging the same, but when any one of the pawls is rotated clockwise around its pivot from the position shown to the dotted line position shown for one of the pawls, the cut-out portion 62 will be moved radially inward to a position in which it will engage the pin 61 and rotate the crank 58 therewith. The pawls are moved from the position shown in solid lines into the dotted line position by means of engagement between the end 64 of a detector member 65 and a central raised portion 66 formed on a leading end of each pawl. The pawls are moved back from their dotted line position to the full line position by means of engagement between the end 64 and one or the other of raised portions 67 which are formed at the sides on the trailing end of each pawl. The detector member 65 is frictionally mounted for movement with the pulley 34 so that as this pulley rotates when the instrument is unbalanced and the print wheel carriage is being moved, the detector will be moved to one side or the other of the position shown in Figure 2. As shown, the cam 68 is a three lobe cam that is rotated around the shaft 59 in a clockwise direction by means of suitable gearing that is driven from the constantly rotating pinion 49. The pawls are held in their solid line or their dotted line positions by means of springs 69 which are attached to the cam 68 and engage the rear end of the pawls.

The cam 68 is continually rotated to bring its raised portions in the V-shaped opening formed in the detector member 65 to periodically bring this member to the position shown in Figure 2. If the instrument is unbalanced, and the pen carriage is being moved, passage of the cable 33 over pulley 34 will move the detector 65 to one side or the other of the midposition shown immediately after it has been straightened out by the cam 68. Each time the end 64 of the detector member is moved out of its central position it will be in the path of one of the portions 67 of the pawls to move the next pawl passing it to the full line position shown. If, however, the instrument has reached a balanced condition, the detector 65 will remain in its midposition where it is moved by the cam 68 and the end 64 will then be in the path of raised portion 66 of the next pawl moving past it. That pawl will then be moved to its dotted line position to bring the cutout portion 62 into the path of pin 61 and will therefore rotate crank 58. As the crank rotates roller 57 will move the compound lever 51, 52 first slightly clockwise to bring the print wheel into engagement with the chart, then counterclockwise, and then back to the position shown. As lever 51 moves it operates through channel member 54 to move plate 44 of the print wheel carriage in a direction to bring one of the print characters on print wheel 45 into engagement with chart 46 to make a record of the temperature thereon. Continued movement of the crank and lever will raise the print wheel from the chart above the position shown and return it to the position shown in the drawing. It is noted that the print wheel carriage is provided with an ink pad wheel 71 that is used to supply ink to the printing characters of the print wheel. Mechanism, not shown, is used to rotate the print wheel and the ink pad wheel after each record is made so that the instrument will be ready to make a record of the temperature of the next thermocouple connected thereto.

While the crank 58 is rotating, shaft 59 upon which it is mounted is used to adjust a thermocouple selector switch to connect another thermocouple to the instrument. To this end, shaft 59 extends through wall 27 where it drives a gear train 72 to adjust a selector switch 73. The gear train is shown conventionally herein as a pair of bevel gears, but it may be of any desired type. The main requisite is that the gear train be so synchronized with the action of the print wheel that the new thermocouple be connected to the instrument immediately after a record is made of the temperature of the thermocouple then connected to the instrument.

With the type of potentiometer circuit disclosed herein rebalancing motor 8 is energized continuously whenever the potentiometer circuit is unbalanced.

This means that if a change should occur in the value of the condition under measurement between the time that balance is detected and the printing operation has been performed that the print wheel carriage will start to move and the record will be blurred. In some cases the chart will be torn. Such a situation may arise, for example, where the instrument is being used to record sunlight intensity and a cloud passes between the primary measuring element and the sun.

Rebalancing motor 8 may be deenergized even when the potentiometer circuit is unbalanced by opening a switch that is placed in one of the motor leads. To this end, a switch 74 is provided in one of the wires extending between amplifier 7 and motor 8. This switch is normally closed, but is opened just as the print wheel 45 moves downwardly from its position in Figures 3 and 4, and is closed again when the print wheel has moved back to the position shown. Operation of the switch is controlled by channel member 54. As this member moves upwardly in Figure 4, a bell-crank lever 75 is moved in a clockwise direction around its pivot 76. Also pivoted at 76 is a lever 77 whose upper end engages a switch actuating button 78. Movement of bell-crank 75 is imparted to lever 77 by a spring 79 that is held in position between a bent over portion 81 on the upper end of the bell-crank and a portion of lever 77. Threaded into lever 77 is a screw or rod 82 that passes through the spring and portion 81 of the bell-crank. A nut 83 is placed on the end of the rod to adjust the initial position of parts 75 and 77 relative to each other.

In operation of this lever system, upward movement of channel member 54 rotates bell-crank 75 in a clockwise direction. This acts through spring 79 to rotate lever 77 and push button 78 to open switch 74. Continued movement of the bell-crank merely compresses spring 79 to give an over-travel movement of the bell-crank. As channel member 54 moves downwardly the lever system moves in a counterclockwise direction and the parts 75 and 77 thereof assume their initial positions with respect to each other. Since the thermocouple switching operation is timed to take place as the channel member is moving downwardly switch 74 will be closed so that motor 8 can start to move the print wheel carriage as soon as the instrument is connected to a new thermocouple, if such movement is necessary.

Switch 74 may be mounted in any convenient place. As shown herein, it is mounted on wall 29 of the chassis or frame 24 by an angle bracket 84.

From the above description it will be seen that I have provided a means to insure that the rebalancing motor will be deenergized during the time that a recording operation is taking place. This mechanism in combination with the type of instrument disclosed herein permits normal operation of the instrument at all times, except that the printing mechanism cannot move between the time balance is detected and the print wheel starts to move and the time that a record is made.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure with Letters Patent is as follows:

1. In a recording instrument having a chart upon which a record is to be made, a recording element normally maintained out of recording engagement with the chart, drive means to shift said recording element across the chart to a position corresponding to the value of a condition to be recorded, actuating means for said recording element operative to move said recording element momentarily into recording engagement with the chart, detecting means to cause operation of said actuating means only when said recording element is substantially in said position, and arresting mechanism constructed and arranged to be operated solely by the operation of said actuating means, when said drive means has shifted said recording element substantially into said position, to prevent shifting of said recording element across the chart when said recording element is in recording engagement with the chart.

2. In a recording instrument having a chart upon which a record is to be made, a balanceable network adapted to be unbalanced in response to variations in the value of a condition, a recording element normally maintained out of recording engagement with the chart, motor means controlled by said network simultaneously to drive said recording element across the chart to a position corresponding to the value of the condition to be recorded and to rebalance said network, actuating means for said recording element operative to move said recording element momentarily into recording engagement with the chart, detecting means to cause operation of said actuating means only when said recording element is substantially in said position, and arresting mechanism constructed and arranged to be operated solely by the operation of said actuating means, when said motor means has shifted said recording element substantially into said position, to prevent said motor means from driving said recording element across the chart when said recording element is in recording engagement with the chart.

3. In a recording instrument having a chart upon which a record is to be made and adapted to record a plurality of values as measured by a plurality of elements, each of which elements is responsive to the value of one of a plurality of different variable conditions, a recording element normally maintained out of recording engagement with the chart, switching mechanism to connect one after the other of the responsive elements to said instrument, drive means to shift said recording element across the chart to a position corresponding to the value of the condition to which the responsive element then connected to the instrument is subjected, actuating means for said recording element operative to move said recording element momentarily into recording engagement with the chart and subsequently to connect another of the responsive elements to said instrument, detecting means to cause operation of said actuating means only when said recording element is substantially in said position, and arresting mechanism constructed and arranged to be operated solely by the operation of said actuating means, when said drive means has shifted said recording element substantially into said position, to prevent shifting of said recording element across the chart when said recording element is in recording engagement with the chart.

4. In a recording instrument having a chart upon which a record is to be made and adapted to record a plurality of values as measured by a plurality of elements, each of which elements is responsive to the value of one of a plurality of different variable conditions, a recording element normally maintained out of recording engagement with the chart, switching mechanism to connect one after the other of the responsive elements to said instrument, a balanceable network adapted to be unbalanced in response to variations in the value of the condition to which the responsive element then connected to the instrument is subjected, motor means controlled by said network to drive said recording element across the chart to a position corresponding to the value of the condition to which the responsive element then connected to the instrument is subjected, actuating means for said recording element operative to move said recording element momentarily into recording engagement with the chart and subsequently to connect another of the responsive elements to said instrument, detecting means to cause operation of said actuating means only when said recording element is substantially in said position, and arresting mechanism constructed and arranged to be operated solely by the operation of said actuating means, when said motor means has shifted said recording element substantially into said position, to prevent shifting of said recording element across the chart when said recording element is in recording engagement with the chart.

5. In a recording instrument having a chart upon which a record is to be made, a recording element to make a record on the chart but normally maintained out of recording engagement with the chart, motor means to move said recording element across the chart to a position corresponding to the value of a variable condition to be recorded, actuating means for said recording element operative to move said recording element momentarily into recording engagement with the chart, detecting means to cause operation of said actuating means only when said recording element is substantially in said position, and arresting mechanism constructed and arranged to be operated solely by the operation of said actuating means, when said motor means has shifted said recording element substantially into said position, to render said motor means inoperative when said recording element is in recording engagement with the chart.

WALTER P. WILLS.

REFERENCES CITED

The following references are of record in the file of this patent:

UNITED STATES PATENTS

| Number | Name | Date |
|---|---|---|
| 2,124,684 | Behr et al. | July 26, 1938 |
| 2,207,343 | Fairchild | July 9, 1940 |
| 2,209,717 | Fairchild et al. | July 30, 1940 |